(12) United States Patent
Schwartz et al.

(10) Patent No.: US 6,553,035 B1
(45) Date of Patent: Apr. 22, 2003

(54) APPARATUS AND METHOD FOR QUEUING DATA

(75) Inventors: Steven J. Schwartz, Sudbury, MA (US); Eric J. Pelletier, Lexington, MA (US); Eric J. Spada, Lexington, MA (US); Jeffrey A. Koehler, Westborough, MA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/338,340

(22) Filed: Jun. 22, 1999

(51) Int. Cl.$^7$ .............................................. H04L 12/28
(52) U.S. Cl. ...................... 370/412; 370/415
(58) Field of Search ................................ 370/412, 413, 370/414, 415, 416, 389, 428, 429; 710/52, 53, 54, 56, 57

(56) References Cited

U.S. PATENT DOCUMENTS

| | | | | |
|---|---|---|---|---|
| 5,487,061 A | * | 1/1996 | Bray | 370/252 |
| 5,499,238 A | * | 3/1996 | Shon | 370/399 |
| 5,748,614 A | * | 5/1998 | Wallmeier | 370/395.41 |
| 5,912,889 A | | 6/1999 | Preas et al. | 370/359 |
| 6,249,524 B1 | * | 6/2001 | Moriwaki et al. | 370/412 |

OTHER PUBLICATIONS

Killat, et. al. "A Versatile ATM Switch Concept," Proceedings of the International Switching Symposium IEEE, vol. SYMP. 13, 28, May 1990, pp. 127–134.

Chen, et. al. "Optimal Buffer Allocation for Packet Switches with Input and Output Queuing" Proceedings of the Global Telecommunications Conference and Exhibition IEEE, vol.—Dec. 2, 1990, pp. 1936–1941.

* cited by examiner

*Primary Examiner*—Ajit Patel
(74) *Attorney, Agent, or Firm*—Donald R. Boys; Central Coast Patent Agency, Inc.

(57) ABSTRACT

An apparatus and method for queuing data such as data being transferred across or within a switching node on a network are described. The queuing apparatus includes a plurality of inputs for receiving data to be transferred to at least one output, each input being adapted to receive data at a data rate associated with the input. Each input transfers data to a relatively short queue which stores the data received at the input. Each output is associated with as many short queues as their inputs capable of transferring data to the output. A long queue associated with the output receives data from each of the short queues associated with the output and forwards the data to the output. A control circuit associated with the output transfers data stored in all of the short queues associated with the output into the long queue. This transfer takes place at a data rate that is higher than the data rate associated with the input such that the short queues are prevented from becoming full. By implementing the queuing system in many short queues instead of fewer long queues, the overall system is more efficient and inexpensive to implement.

38 Claims, 4 Drawing Sheets

APPARATUS AND METHOD FOR QUEUING DATA

FIELD OF THE INVENTION

The invention relates generally to the field of digital communications, and more particularly to systems and methods for queuing data being transferred between devices such as switching nodes in a digital data network.

BACKGROUND OF THE INVENTION

In digital communications systems, data can be transferred from an input or transmitting device to an output or receiving device. In such systems, it often occurs that data cannot immediately be transferred from the input device to the output device for some reason such as congestion or high data traffic at the input device and/or the output device. To solve this problem, such systems implement a queuing function which can buffer or queue data at the input and/or output devices. Input-queued data can be temporarily stored until it can be transferred to the output device. Output-queued data, which has been transferred from the input device, can be temporarily stored until it is forwarded to its eventual destination by the output device. One application for data queuing is in digital networks.

Digital networks have been developed to facilitate the transfer of information including data and programs among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnected pattern can allow for a number of paths to be available through the network from each computer system or other device.

Information transferred from a source device to a destination device is generally transferred in the form of fixed-length or variable-length data packets, each of which is in general received by a switching node over a communication link and transmitted over another communication link to facilitate transfer of the packet to the destination device or to another switching node along a path to the destination device. Each packet typically includes address information including a source address that identifies the device that generated the packet and a destination address that identifies the particular device or devices which are to receive the packet.

Typically, a switching node includes one or more input ports, each of which is connected to a communication link on the network to receive data packets, and one or more output ports, each of which is also connected to a communication link on the network to transmit packets. Each node typically also includes a switching fabric that couples data packets from the input ports to the outport ports for transmission.

When an input port receives a packet from the network, it typically buffers the packet. It uses the destination address of the packet to identify the particular output port that is to transmit the packet onto the network and then transfers the packet to the identified output port through the switching fabric. When the output port receives the packet, it typically buffers the packet in a queue where it awaits transmission onto the network over the appropriate communication link. While buffering and scheduling by the output port can provide for efficient packet transmission by the output port, since the output port can be kept continually busy, several problems can arise with conventional output port buffering. Generally, each output port effectively provides one queue for each input port, in which case the total number of queues provided by the switching node will be on the order of $N^2$, where N is the number of input ports, which, in turn, corresponds to the number of output ports, if, as is typical, each communication link provides for bidirectional transmission of packets. Thus, as N increases, the number of queues maintained by the output ports generally increases approximately quadratically.

Queues are generally expensive pieces of hardware, and, in general, the longer the queue, the more expensive it is to implement. Switching nodes in modern networks must accommodate large amounts of data which are transferred over network links at increasingly high rates. Communication links and the switching nodes to which they are connected must accommodate large bursts of data which occur in very short amounts of time, i.e., at very high rates. The average data rates that must be accommodated can also be very high. With these increased high data rates comes an increase in the required queuing capacities of the switching nodes, which results in the requirement that larger queues be implemented. Thus, the development of larger and faster systems results in the need for increasing numbers of longer queues, which in conventional queuing approaches can in turn result in increased cost.

SUMMARY OF THE INVENTION

The present invention is directed to an apparatus and method for queuing data. The invention can be employed in systems such as switching nodes on a digital network to queue data packets that are being transferred over the network or other types of data that are being transferred within the switching node itself. The queuing system of the invention is used to queue data that is being transferred from an input device, such as an input port module in a network switching node, to an output device, such as an output port module in a network switching node. The queuing apparatus of the invention utilizes a plurality of input ports in the input device that receive data to be transferred to the output device, such as from a communication link on a digital network. Each input port is adapted to receive the data at a data rate that is associated with the input port. The device includes a plurality of short queues for storing data received at the plurality of input ports. A long queue having more data storage capability than each of the short queues receives and stores data from the plurality of short queues and forwards the stored data toward the output device. A control circuit controls the transfer of data from the short queues to the long queues. The data are transferred at a second data rate higher than at least one of the data rates associated with the short queues such that a data threshold associated with at least one of the short queues is not exceeded. That is, in one embodiment, the short queues are emptied at a rate that is fast enough the prevent the at least one short queue from becoming full.

In general, each of the input ports can be associated with and operate at a different data rate. In one embodiment, the data rate associated with the input ports is selected to be the maximum data rate of all of the data rates associated with all of the input ports. In this case, because the control circuit transfers data from the short queues to the long queues at a rate faster than the selected rate, it is insured that none of the input queues will store data beyond their thresholds. For example, none of the queues will become full.

In one embodiment, the control circuit is associated with the output device for transferring data from the associated short queues to the associated long queue. The output device can include multiple output ports, in which case, the system would include multiple control circuits, each associated with a single output port.

The control circuit can include a selection circuit which selects the short queues to enable each short queue to transfer data to the long queue. The short queues can be selected in turn in a round-robin fashion, with each short queue being selected at a rate faster than the data rate associated with the input communication link. In one particular embodiment, during the round-robin selection process, before each queue is accessed, the control circuit determines whether each queue has data to be transferred. If no data is to be transferred, the queue can be skipped. This results in saving the time that would have been allocated for retrieval of data from the particular short queue. In one embodiment, the selection circuit includes a multiplexer for selectively passing data from selected short queues to the long queue. The multiplexer is activated to select individual short queues in turn as desired.

Each of the short queues can be associated with an input port. Therefore, the output device is associated with as many short queues as there are input ports associated with the output device. In the common case in which there are as many output ports in the output device, e.g., N output ports, as there are input ports in the input device, e.g., N input ports, $N^2$ short queues would be implemented.

The queue length required for a particular input port is a function of the allowed data rate for the associated communication link as well as the rate at which the queue is emptied. In general, the faster the rate at which the queue is emptied, the shorter the queue needs to be. In one embodiment, because the queues are emptied at a rate faster than the data rate of the communication link, the short queues are shorter than the queue that would be required in a system in which the queues were emptied at a rate equal to or less than the data rate of the associated communication link. These smaller short queues can be implemented more efficiently and less expensively than the queues that would be required in a conventional system.

The queuing apparatus of the invention can also include an additional queue for each output port. This "third" queue can receive data from the long queue. The data stored in the third queue can then be retrieved for transfer to the output device. The third queue can receive data from the long queue at a rate that is slower than the rate at which the long queue receives data from the short queues. The rate can be slower because of the smoothing effect that the long queue has on the short queues. That is, the long queue, be periodically draining the short queues and storing their data, smooths or averages any large spikes in the rate at which data is received at the input device, i.e., bursts. In one embodiment, such as where the queuing apparatus of the invention is implemented in a network switching node in which the output device includes one or more output ports connected to one or more communication links, the rate at which the third queue is emptied can be adjusted to accommodate a data rate associated with the output device, e.g., a data rate at which a communication link connected to an output port operates.

As described above, the queuing apparatus and method of the invention be implemented in a switching node on a network. The switching node to which the queuing apparatus and method of the invention can be applied can include a plurality of input ports that receive data from the network. Each input port can receive data over a respective associated communication link of the network at a data rate associated with the respective communication link. The node also includes at least one output port that transfers data onto the network over a communication link. The output port can receive data from a plurality of associated input ports of the switching node. Associated with the at least one output port is a plurality of short queues. The short queues store data received at the input ports. A long queue, that is, a queue having more data storage capability than each of the short queues, is associated with the output port. It receives and stores data from the plurality of input ports that are associated with the output port. That is, data from the associated short queues are transferred to the long queue. A control circuit is implemented to control transfer of the data from the short queues to the long queue. The control circuit removes data from the short queues and transfers it to the long queue at a rate faster than at least one of the data rates associated with the input ports, such that a threshold associated with at least one of the short queues is not exceeded. For example, a threshold may be selected for each queue to indicate when it is fill. This structure allows the required queuing capacity to be implemented in multiple short queues and one relatively longer queue, resulting in increased queuing capacity and reduced overall expense.

Each of the communication links associated with input ports of the switching node can, in general, operate at a different rate. This can be attributed to the fact that the links can be used by a variety of users which transfer data at different rates and/or are constrained to different data rates in accordance with their individual contractual usage requirements. In one embodiment, the data rate associated with the input ports is selected to be the maximum data rate at all of the associated communication links. The result is that when the control circuit removes data from the short queues at a faster rate, none of the queues will exceed their thresholds.

In one embodiment, the control circuit is associated with the output port for transferring data from the associated short queues to the associated long queue. The switching node can include multiple output ports; therefore, the node can include multiple control circuits, each of which is associated with the output port. The control circuit can include a selection circuit which selects the short queues to enable each short queue to transfer data to the long queue. The short queues can be selected in turn in a round-robin fashion, with each queue being selected at a rate faster than the at least one data rate associated with the input communication links, such that it is ensured that the threshold data levels in the short queues are not exceeded. In one particular embodiment, the selection circuit includes a multiplexer for selectively passing data from selected short queues to the long queue. The multiplexer is activated to select individual short queues in turn as desired.

The apparatus and method of the invention used to efficiently implement data queuing is applicable in various networks in which data queuing is used. For example, the invention can be implemented in a switching node of the type described in copending U.S. patent application Ser. No. 09/108,771, filed on Jul. 2, 1998, entitled "System and Method for Switching Packets in a Network," by Schwartz, et al, and assigned to the same assignee as the present application. The contents of that application are incorporated herein in their entirety by reference.

As mentioned above, the data queuing apparatus and method of the invention provide a more efficient and less expensive queuing implementation than prior approaches. Because multiple short queues are used, less hardware is required to implement data queuing. As a result, less expensive hardware can be used, resulting in a less expensive overall system.

DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
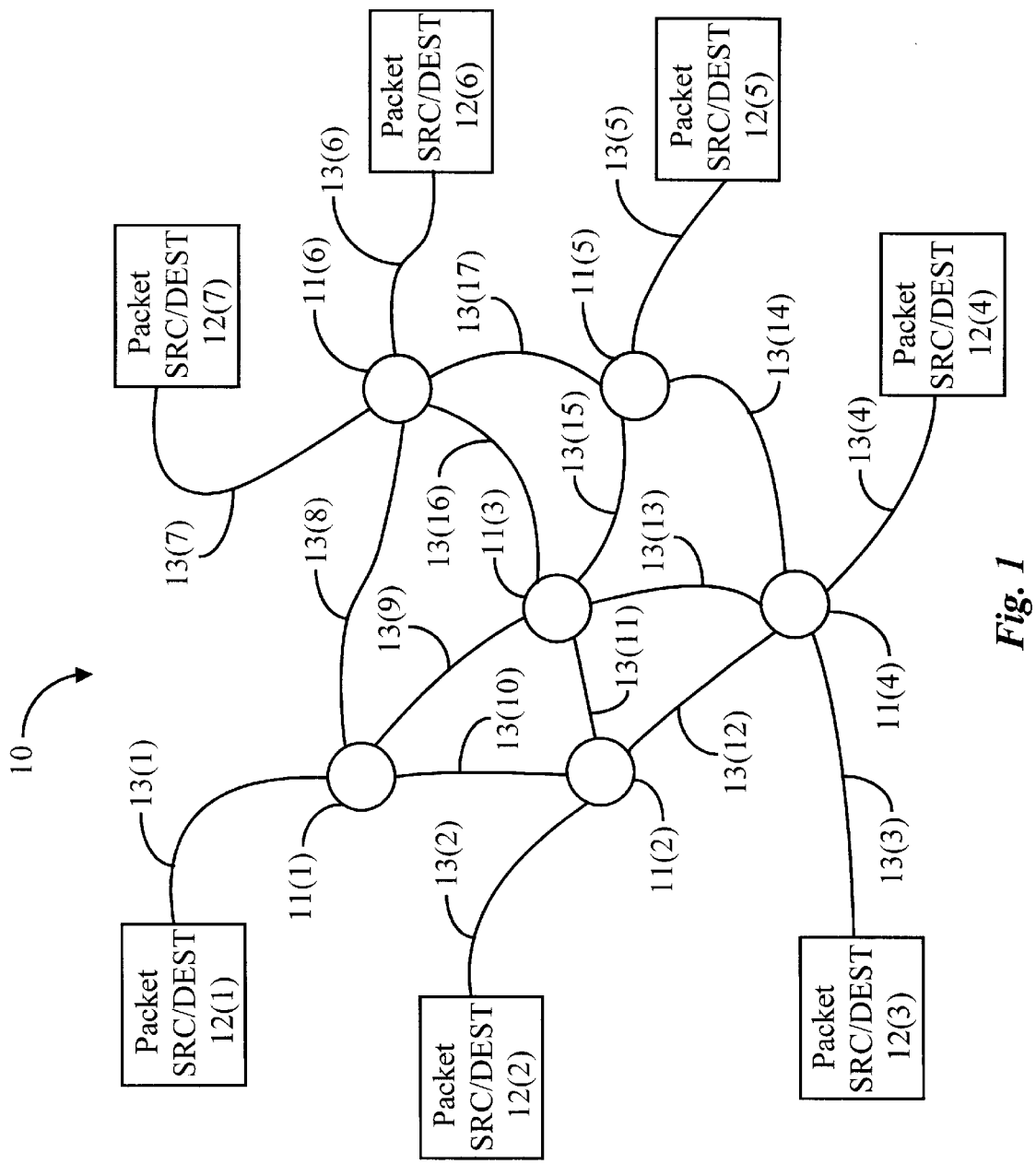
FIG. 1 contains a schematic diagram of a computer network including a plurality of switching nodes in accordance with the present invention.

FIG. 1 schematically depicts a computer network 10 including a plurality of switching nodes 11(1) through 11(N), generally identified by reference numeral 11, for transferring signals representing data among a number of devices, which in FIG. 1 are represented by packet source/destination devices 12(1) through 12(M), generally identified by reference numeral 12, in a wide area network ("WAN"). The packet source/destination devices 12 can include a particular device such as a computer system or other device that stores, generates, processes or otherwise uses digital data. It can also be a local area network of such devices. Each packet source/destination device 12 is connected over a communication link, generally identified by reference numeral 13, to a switching node 11 to facilitate transmission of data thereto or the reception of data therefrom.

The switching nodes 11 are interconnected by communication links, also generally identified by reference numeral 13, to facilitate the transfer of information among the switching nodes 11(n). The communication links 13 may utilize any convenient information transmission medium, including, for example, wires for carrying electrical signals, optical fiber links for carrying optical signals, and so forth. Each communication link 13 is preferably bidirectional, allowing the switching nodes 11 to transmit and receive signals among each other and with customer premises equipment 12 connected thereto over the same link. Depending on the particular type of medium selected for respective communication links 13, multiple media may be provided for transferring signals in opposite directions thereby to provide the bidirectional link.

Data are transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used; in one embodiment, the well-known Internet protocol ("IP") is used. In any case, the header typically includes address information including a source address identifying the particular source device $12(m_S)$ that generated the packet and a destination address identifying the particular destination address $12(m_D)$ that is to receive the packet. In the IP protocol, a packet may be of variable length and the header typically also includes length information to identify the length of the packet. The header also typically includes other information, including, for example, protocol identifier information that identifies the particular protocol that defines the structure of the packet. The data portion contains the data payload of the packet. The packet may also include, as part of the data portion or otherwise, error detection information that can be used to determine whether an error occured in transferring the packet.

A source device $12(m_S)$, after generating a packet for transfer to a destination device $12(m_D)$, provides the packet to the switching node 11(n) to which it is connected. The switching 11(n) uses the destination address in the packet to attempt to identify a route over which it is to transfer the packet to forward the packet to either the destination device $12(m_D)$, if the switching node 11(n) is connected to the destination device $12(m_D)$, or to another switching node 11(n) (n'≠n) along a path to the destination device $12(m_D)$. The route associates a destination address with one of the communication links 13 connected to the switching node. If the switching node can identify a route for the received packet, it will forward the packet over the communication link identified by the route. Each switching node 11(n), 11(n"), . . . that receives the packet will perform a similar operation. If all of the switching nodes have respective routes for the destination address, the packet will eventually arrive at the destination device $12(m_D)$.

Figure 2:
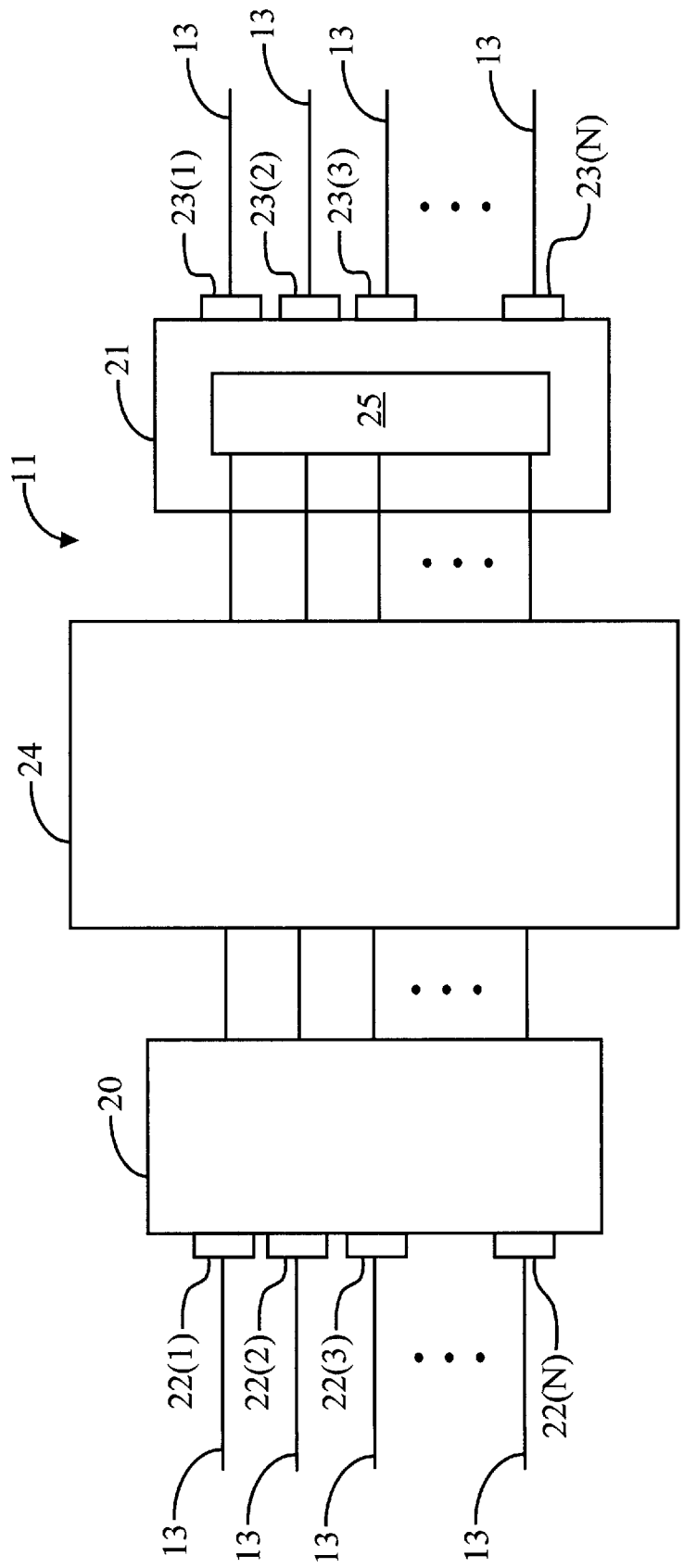
FIG. 2 contains a schematic block diagram of one embodiment of a switching node which includes one embodiment of queuing circuitry in accordance with the present invention.

FIG. 2 is a schematic block diagram of one embodiment of a switching node 11 in accordance with the present invention. The node 11 in general includes one or more input port modules 20 and one or more corresponding output port modules 21. The input port module 20 and output port module 21 are connected to processing circuitry and switching fabric 24 which controls forwarding of data from the input port module 20 to the output port module 21. In general, each input port module 20 includes one or more input ports 22(1) through 22(N), which can be connected to communication links 13. Likewise, each output port module 21 includes one or more output ports 23(1) through 23(N) which can in general be connected to multiple communication links 13. Data received on each of the links 13 are forwarded from the associated input port 22 of the input port module 20, across the processing circuitry and switching fabric 24, to the appropriate output port 23 of the output port module 21 and out onto the network on the appropriate link 13.

As shown in FIG. 2, the output port module 21 can also include queuing circuitry 25 in accordance with the present invention. The queuing circuitry 25 is used to queue data arriving at the output port module 21 from the processing circuitry and switching fabric 24. As described below, the queuing circuitry 25 provides an efficient low-cost means of temporarily storing data packets before they are transferred to network communication links 13 via output ports 23. It should be noted that the queuing circuitry 25 need not be located in the output port module 21.

Figure 3:
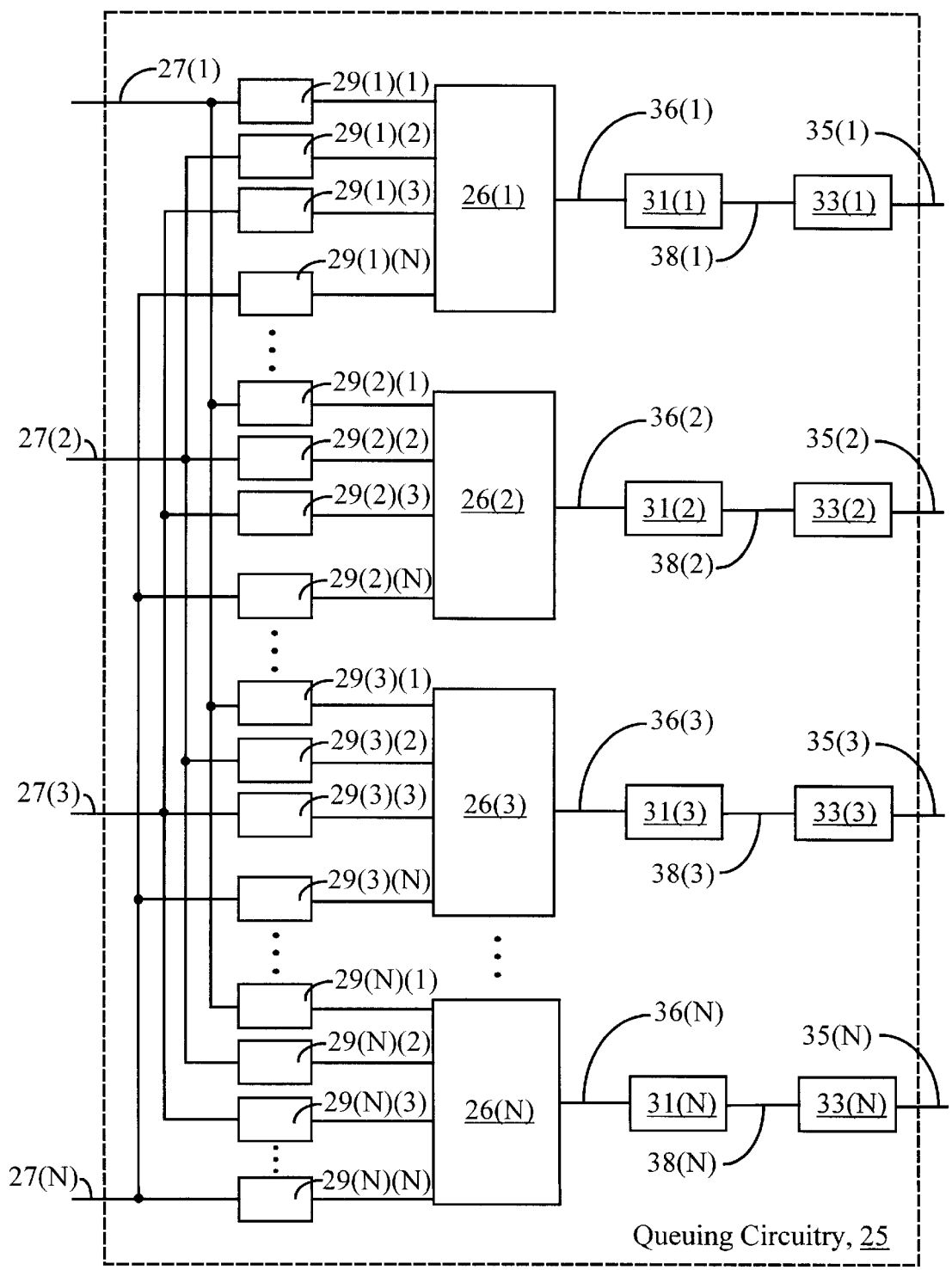
FIG. 3 contains a schematic block diagram of one embodiment of the queuing circuitry shown in FIG. 2.

FIG. 3 is a schematic block diagram of one embodiment of the queuing circuitry 25 shown in the output port module 21 in FIG. 2. As shown, input lines labeled 27(1), 27(2), 27(3), ..., 27(N) receive data that are to be forwarded out of the output port module 21 to the network. The input lines 27 are coupled through the processing circuitry and switching fabric 24 to the input ports 22 in the input port module 20 as shown in FIG. 2. Data packets arriving at the inputs 27 are transferred to and temporarily stored in queues of the queuing circuitry 25 until they are transferred to the queuing circuitry outputs 35(1), 35(2), 35(3), ..., 35(N). The outputs 35(1) through 35(N) forward the data to output ports 23(1) through 23(N), respectively, as shown in FIG. 2.

Each output port 35 is associated with queuing and control circuitry which temporarily stores the data before it is forwarded out of the output port module 21. Each output port 35 is associated with a group of short queues 29, each of which is associated with an individual input 27. In general, for each output 35, there are associated as many short queues 29 as there are inputs 27 capable of transferring data to the output 35. For example, output 35(1) can receive data from all inputs 27(1) through 27(N). Therefore, output 35(1) has associated with it N short queues 29(1)(1), 29(1)(2), 29(1)(3), ..., 29(1)(N). Likewise, in the illustrated embodiment, each of the N outputs 35 can receive data from each of the N inputs 27, and, therefore, each output 35 has associated with it N short queues 29. In the illustrated embodiment, since there are N inputs and N outputs, the queuing circuitry 25 includes $N^2$ short queues 29.

The outputs 35(1) through 35(N) are also associated with longer queues 31(1) through 31(N), respectively. Each of these longer queues 31 has more storage capacity than their associated short queues 29. In accordance with the invention, a control circuit or selection circuit 26 controls the transfer of data from the short queues 29 to the long queue 31 in such a manner that the amount of data stored in any of the short queues 29 does not exceed predetermined thresholds. For example, the queues 29 are emptied by the control circuit 26 such that they do not become full. This is done by emptying the queues 29 at a rate which is effectively faster than the rate at which the queues 29 can fill. In general, each of the inputs 27(1) through 27(N) is associated with a maximum allowable data rate, i.e., the maximum rate at which data can be expected to appear at the inputs 27. The maximum rate will be referred to herein as "x". Hence, the maximum data rates for each of the inputs 27(1), 27(2), 27(3), ..., 27(N) are referred to as x(1), x(2), x(3), ..., x(N). For ease of description, the data rate at which data can be received at all of the inputs will be referred to simply as x. In one embodiment, x is chosen as the maximum of the possible data rates x(1) through x(N).

As data arrives at the inputs 27, the data are routed to short queues 29 according to the output 35 to which the data are to be transferred. Given that there are N input ports in this illustration, data can be considered to arrive at each of the short queues 29 at a rate which can be referred to as x/N. The selection circuit 26 periodically transfers data from each of its associated short queues 29 along line 36 to the longer queue 31 such that the rate of data transfer on line 36 is greater than x. In one embodiment, to accomplish this, the selection circuit 26 accesses each short queue 29 in turn in a round-robin fashion to transfer its data to the long queue 31. The circuit 26 accesses each queue 29 at a fast enough rate to ensure that the data transfer rate at line 36 is greater than x. As a result, the short queues 29 are emptied fast enough such that they do not overflow.

Data to be transferred to outputs 35 can be read from the longer queue 31 as desired. In one embodiment, the data are transferred directly from queue 31 to the output 35. In this embodiment, data are read from the long queue 31 and forwarded on line 38 to the output 35 at a rate that is compatible with the output 35 and, therefore, the communication link on which the data will eventually be transmitted. In another embodiment, as shown in FIG. 3, a second long queue 33 is interposed between the first long queue 31 and the output 35. In this embodiment of FIG. 3, where the second long queue 33 is used, the data can be read from the first long queue 31 at a faster rate and then read from the second long queue 33 at the rate compatible with output 35 and its associated communication link. The two long queues 31 and 33 can be implemented as a single queue where a first portion can be accessed at a higher rate than a second portion.

Figure 4:
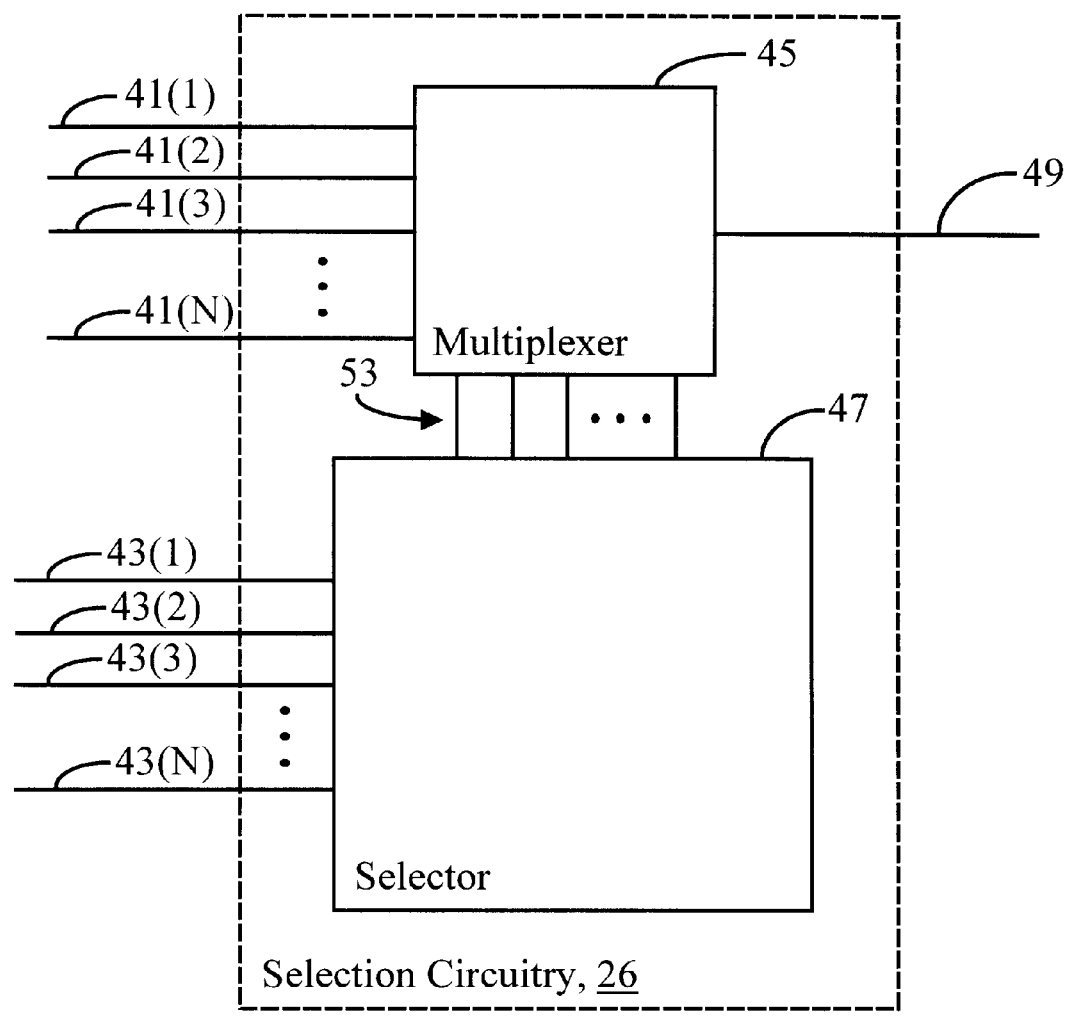
FIG. 4 contains a schematic block diagram of one embodiment of selection circuitry used in the queuing circuitry of FIG. 3.

FIG. 4 is a detailed schematic block diagram of the control circuitry or selection circuitry 26 shown in FIG. 3. In one embodiment, each selection circuit 26 includes a multiplexer 45 which operates under the control of a selector 47 to selectively pass data from the short queues 29, received on data lines 41(1) through 41(N), to the multiplexer output 49, which is connected to line 36 as shown in FIG. 3. The selector circuit 47 generates outputs 53 which serve as the select inputs to the multiplexer 45. The selector 47 activates the select lines 53 to select one input 41 at a time to forward short queue 29 data across the multiplexer 45. The select lines 53 select the lines 41 at a rate that provides for data transfer on line 49 at a rate greater than the input data rate x.

In the embodiment shown in FIG. 4, the selector 47 also receives from each short queue 29 a data line 43 which indicates whether the particular queue 29 has data ready to be transferred. If the line 43 is active, then the queue 29 is considered to have data available, and the selector 47 selects the data line 41 of that queue 29 via the select lines 53. As a result, the available data is transferred on the data lines 41 across the multiplexer 45. If the line 43 is inactive, then the associated queue 29 does not have data available, and the selector 47 skips the queue 29. Using this approach, the selection circuitry 26 can save considerable time that would otherwise be lost in attempting to transfer data out of queues that have no data available.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for queuing data to be transferred from an input device to an output device comprising:
    a plurality of input ports in the input device for receiving data to be transferred to the output device, each input port being adapted to receive the data at a data rate associated with the input port;
    a plurality of short queues for storing data received at the plurality of input ports;
    a long queue having more data storage capability than each of the short queues, the long queue receiving and storing data from the plurality of short queues and forwarding stored data toward the output device; and
    a control circuit for transferring data stored in the plurality of short queues into the long queue at a second data rate higher than at least one of the data rates associated with the short queues such that a data threshold associated with at least one of the short queues is not exceeded.

2. The apparatus of claim 1 wherein the at least one of the data rates associated with the communication links is the maximum of the data rates associated with the communication links.

3. The apparatus of claim 1 wherein the control circuit comprises a selection circuit for selecting the short queues to enable data transfer.

4. The apparatus of claim 3 wherein the short queues are selected in turn in round-robin fashion.

5. The apparatus of claim 3 wherein if a short queue has no data to be transferred, the selection circuit does not select the short queue.

6. The apparatus of claim 3 wherein the selection circuit comprises a multiplexer for selectively forwarding data from a selected short queue to the long queue.

7. The apparatus of claim 1 wherein each of the short queues has less data storage capability than would be required if the data were transferred out of the short queues at the at least one of the data rates associated with the communication links.

8. The apparatus of claim 1 further comprising a second long queue for storing data retrieved from the first long queue at a third data rate.

9. The apparatus of claim 8 wherein the third data rate is lower than the second data rate.

10. A method of queuing data to be transferred from an input device to an output device comprising:
providing a plurality of input ports in the input device for receiving data to be transferred to the output device such that each input port is adapted to receive the data at a data rate associated with the input port;
providing a plurality of short queues for storing data received at the plurality of input ports;
providing a long queue having more data storage capability than each of the short queues such that the long queue can receive and store data from the plurality of short queues and the long queue can forward stored data toward the output device; and
transferring data stored in the plurality of short queues into the long queue at a second data rate higher than at least one of the data rates associated with the short queues such that a data threshold associated with at least one of the short queues is not exceeded.

11. The method of claim 10 wherein the at least one of the data rates associated with the communication links is the maximum of the data rates associated with the communication links.

12. The method of claim 10 further comprising providing the control circuit with a selection circuit for selecting the short queues to enable data transfer.

13. The method of claim 12 wherein the short queues are selected in turn in round-robin fashion.

14. The method of claim 12 wherein if a short queue has no data to be transferred, the selection circuit does not select the short queue.

15. The method of claim 12 wherein the selection circuit comprises a multiplexer for selectively forwarding data from a selected short queue to the long queue.

16. The method of claim 10 wherein each of the short queues has less data storage capability than would be required if the data were transferred out of the short queues at the at least one of the data rates associated with the communication links.

17. The method of claim 10 further comprising providing a second long queue for storing data retrieved from the first long queue at a third data rate.

18. The method of claim 17 wherein the third data rate is lower than the second data rate.

19. A switching node for transferring data on a network, the switching node comprising:
a plurality of input ports for receiving data from the network, each input port being adapted to receive data over a respective communication link of the network at a respective data rate associated with the respective communication link;
at least one output port for transferring data to the network over a communication link, each output port being adapted to receive data from a plurality of associated input ports;
a plurality of short queues associated with the at least one output port, the short queues storing data received at the plurality of input ports associated with the at least one output port;
a long queue having more data storage capability than each of the short queues, the long queue being associated with the at least one output port and receiving and storing data from the plurality of short queues associated with the at least one output port; and
a control circuit for transferring data stored in the plurality of short queues into the long queue at a second data rate higher than at least one data rate associated with the communication links such that a data threshold associated with at least one of the short queues is not exceeded.

20. The switching node of claim 19 wherein the at least one of the data rates associated with the communication links is the maximum of the data rates associated with the communication links.

21. The switching node of claim 19 wherein the control circuit comprises a selection circuit for selecting the short queues to enable data transfer.

22. The switching node of claim 21 wherein the short queues are selected in turn in round-robin fashion.

23. The switching node of claim 21 wherein if a short queue has no data to be transferred, the selection circuit does not select the short queue.

24. The switching node of claim 21 wherein the selection circuit comprises a multiplexer for selectively forwarding data from a selected short queue to the long queue.

25. The switching node of claim 19 wherein the at least one output port is associated with the same number of short queues as the number of input ports associated with the at least one output port.

26. The switching node of claim 19 wherein each of the short queues has less data storage capability than would be required if the data were transferred out of the short queues at the at least one of the data rates associated with the communication links.

27. The switching node of claim 19 further comprising a second long queue for storing data retrieved from the first long queue at a third data rate.

28. The switching node of claim 27 wherein the third data rate is lower than the second data rate.

29. A method of transferring data on a network at a switching node on the network, the method comprising:
providing a plurality of input ports at the switching node for receiving data from the network, each input port being adapted to receive data over a respective communication link of the network at a respective data rate associated with the respective communication link;
providing at least one output port for transferring data to the network over a communication link, each output port being adapted to receive data from a plurality of associated input ports;
providing a plurality of short queues associated with the at least one output port, the short queues storing data received at the plurality of input ports associated with the at least one output port;

providing a long queue having more storage capability than each of the short queues, the long queue being associated with the at least one output port and receiving and storing data from the plurality of short queues associated with the at least one output port; and transferring data stored in the plurality of short queues into the long queue at a second data rate higher than at least one of the data rates associated with the communication links such that a data threshold associated with at least one of the short queues is not exceeded.

30. The method of claim 29 wherein the at least one of the data rates associated with the communication links is the maximum of the data rates associated with the communication links.

31. The method of claim 29 further comprising providing the control circuit with a selection circuit for selecting the short queues to enable data transfer.

32. The method of claim 31 wherein the short queues are selected in turn in round-robin fashion.

33. The method of claim 31 wherein if a short queue has no data to be transferred, the selection circuit does not select the short queue.

34. The method of claim 31 wherein the selection circuit comprises a multiplexer for selectively forwarding data from a selected short queue to the long queue.

35. The method of claim 29 wherein the at least one output port is associated with the same number of short queues as the number of input ports associated with the at least one output port.

36. The method of claim 29 wherein each of the short queues has less data storage capability than would be required if the data were transferred out of the short queues at the at least one of the data rates associated with the communication links.

37. The method of claim 29 further comprising providing a second long queue for storing data retrieved from the first long queue at a third data rate.

38. The method of claim 37 wherein the third data rate is lower than the second data rate.

\* \* \* \* \*